United States Patent [19]

Sadjadi

[11] 4,163,228

[45] Jul. 31, 1979

[54] INFORMATION DISPLAY SYSTEM HAVING DIGITAL LOGIC INTERCONNECTIONS

[76] Inventor: Kambiz M. Sadjadi, 2420 Yorktown St., Apt. 485, Houston, Tex. 77056

[21] Appl. No.: 810,483

[22] Filed: Jun. 27, 1977

[51] Int. Cl.[2] .................................. G06F 3/14

[52] U.S. Cl. .................................. 340/711; 340/762; 340/813

[58] Field of Search ................ 340/168 S, 337, 365 R, 340/311, 325, 379, 324 R

[56] References Cited

U.S. PATENT DOCUMENTS

| | | | |
|---|---|---|---|
| 1,054,336 | 2/1913 | Brown | 340/337 |
| 2,146,576 | 2/1939 | Haselton et al. | 340/337 |
| 3,178,699 | 4/1965 | Burton | 340/337 |
| 3,493,957 | 2/1970 | Brooks | 340/336 |
| 3,526,887 | 9/1970 | Erni | 340/379 |
| 3,684,870 | 8/1972 | Nelson | 340/378 R |

*Primary Examiner*—Marshall M. Curtis
*Attorney, Agent, or Firm*—Arnold, White & Durkee

[57] ABSTRACT

An information display system is characterized by a visual display board which includes a plurality of display panels, each panel having an arrangement of lamps associated therewith. Also provided is a keyboard having a plurality of keys, each key corresponding to a predetermined informational character, the actuation of which generates an electrical signal of predetermined duration. Circuit control means, including a logic arrangement, is associated with each display panel and connected electrically with the keyboard. The control means is operable to sequentially illuminate selected ones of the plurality of lamps associated with each display panel to display on each panel a single informational character in response to the electrical signal generated by actuation of the predetermined one of the keys. Means are associated with the logic arrangement for sequentially enabling the control circuit for the next-successive panel upon the illumination and display of an informational character on a given panel.

3 Claims, 8 Drawing Figures

INFORMATION DISPLAY SYSTEM HAVING DIGITAL LOGIC INTERCONNECTIONS

BACKGROUND OF THE INVENTION

1. Field of the Invention

This invention relates to an electronic information display system.

2. Description of the Prior Art

Current information display systems utilizing electronic circuitry are characterized in the typical case by the complexity of their electronics and the attendant high cost. Furthermore, several of the more sophisticated electronic information display systems utilize memory elements whereby entire messages are retained in memory prior to the display thereof on suitable illuminated panels. For example, U.S. Pat. No. 3,594,778 (Herald, et al), U.S. Pat. No. 3,868,675 (Firmin), U.S. Pat. No. 3,750,138 (Burgan) and U.S. Pat. No. 3,416,133 (Hunkins, et al) are all believed to exemplify the complex electronic circuitry which includes memory elements therewithin to provide information displays. Such systems are typically expensive and not affordable by the majority of small businesses which would require some sort of information display arrangement to advertise the existence of goods or wares and prices thereof.

Other display apparatus include U.S. Pat. No. 1,143,201 (Jones), U.S. Pat. No. 1,235,005 (Brown), U.S. Pat. No. 2,770,061 (Marcy), U.S. Pat. No. 2,920,408 (McGuire), U.S. Pat. No. 3,076,187 (Bichell, et al), U.S. Pat. No. 3,128,456 (Romero), and U.S. Pat. No. 3,573,792 (Reed).

These above-cited patents usually utilize a predetermined plurality of illuminating lamps arranged in a matrix array such that the selective energization of predetermined ones of the lamps in response to an electrical signal permits informational content to be visually transmitted to a viewer.

The utility of such visual information display systems for use in stores, restaurants, theaters, or other business establishments where frequent changes of statements of information are needed is apparent. It would be advantageous therefore to provide such an electronic information display system adaptable to frequent alterations of the displayed message. It would be further desirable to provide an electronic control circuit of such simplicity and redundancy as to be affordable by even the smallest business establishment.

SUMMARY OF THE INVENTION

This invention relates to an information display system which comprises a visual display board which includes a plurality of visual display panels, a keyboard having a plurality of keys corresponding to certain informational characters, and a control circuit means, including a logic arrangement, associated with each display panel and connected with the keyboard for sequentially illuminating each panel to display thereon a single informational character in response to an electrical signal generated by actuation of one of the keys. The visual display board may conveniently include a matrix array comprising a plurality of LED signal lamps. Actuation of a given key on the keyboard generates a signal enabling the circuit control means to illuminate selected ones of the plurality of the LED lamps associated with a given panel to display the selected informational character thereon. Means are also provided and associated with the logic arrangement of the control circuit for sequentially enabling the control means associated with the next-successive panel when a given panel is displaying an informational character, as by illumination of the lamps associated with the given panel. Further provided are means for selectively disenabling the control circuit associated with a given panel upon the condition that the next-successive panel is not displaying an informational character. Also provided are means for simultaneously disenabling, or clearing, each circuit control means associated with each display panel.

BRIEF DESCRIPTION OF THE DRAWINGS

The invention will be more fully understood from the following detailed description thereof, taken in connection with the accompanying drawings which form a part of this application and in which.

DESCRIPTION OF PREFERRED EMBODIMENT

Figure 1A:
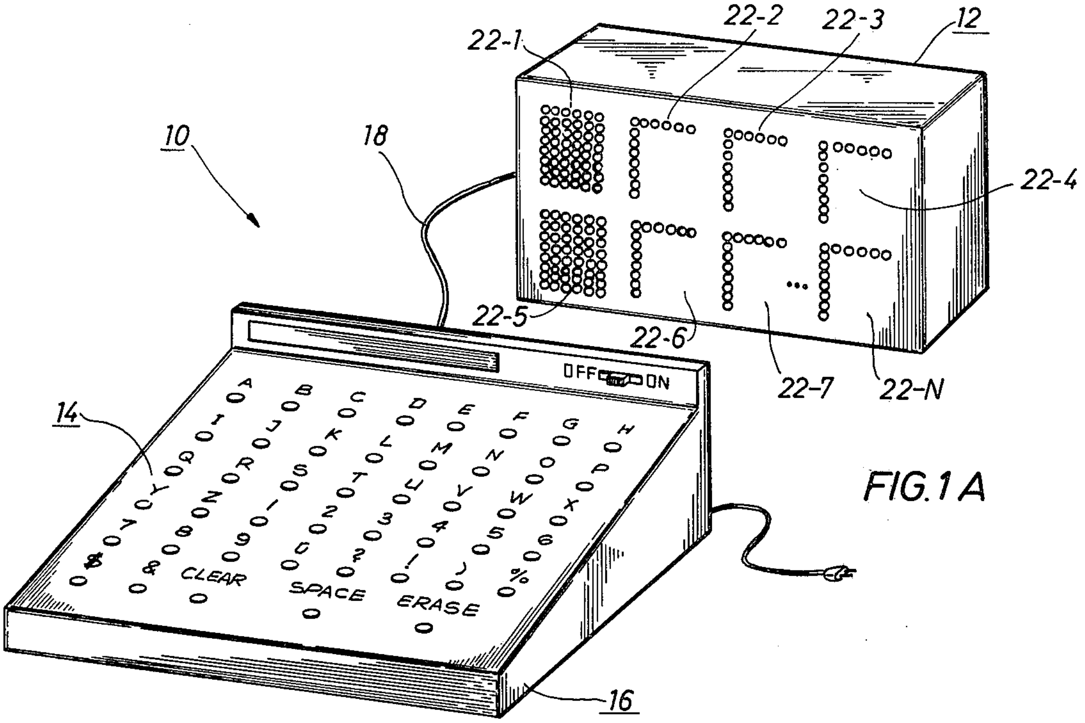
FIGS. 1A and 1B are diagrammatical illustrations of two structural embodiments of the information display system embodying the teachings of this invention.

Throughout the following description, similar reference numerals refer to similar elements in all figures of the drawings.

Figure 1B:
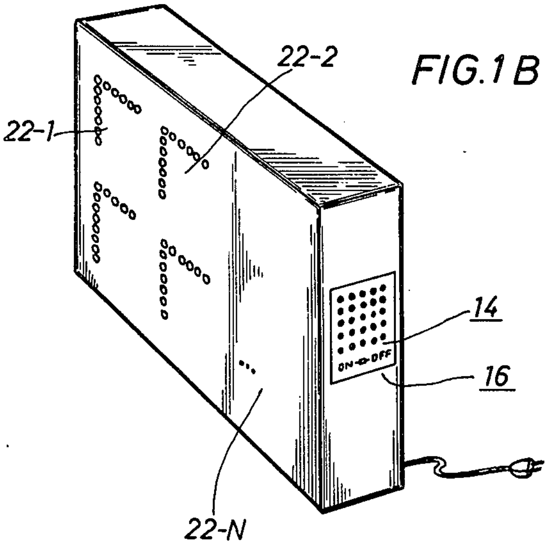

As seen in FIGS. 1A and 1B, the electronic information display system 10 includes a window display board generally indicated by reference numeral 12, a keyboard 14, and a control circuit 16. The internal circuit details of the control circuit 16 are explained in more detail herein. In the embodiment shown in FIG. 1A, the control circuit 16 and keyboard 14 are disposed in a housing physcially separated from the housing for the visual display board 12. Electrical connections are facilitated by a suitable cable 18. In the alternate embodiment of the invention shown in FIG. 1B, the window display board 12, the keyboard 14 and the control circuit 16 are all fabricated in one integral housing. When the control circuit 16 is manufactured in a microcircuit form it is possible to dispose the keyboard 14 and the control circuit 16 integrally with the window display board 12. In either embodiment of FIG. 1A or 1B, the manner by which the control circuit 16 operates to display information entered through the keyboard 14 onto the window display board 12 is the same. It is appreciated and understood that FIGS. 1A and 1B are only diagrammatical as to the relative sizes of various elements of the system 10 and are intended for illustrative purposes only.

The window display board 12 includes a predetermined plurality of display panels 22, the number of such display panels being dependent upon the amount of information being transmitted and the format thereof. It is understood that any predetermined number of display panels, formed in any suitable arrangement of rows and columns is within the contemplation of this invention, with FIGS. 1A and 1B being illustrative only. Each display panel includes a plurality of illuminating lamps formed in any suitable or desired configuration. Typically, a matrix display comprising 35 LED lamps configured in 5×7 array are suitable as the illuminating lamps. As is understood by those skilled in the art, illumination of various preselected ones of the LED lamps within the array forms an informational character within the individual one of the display panel 22. It is, of course, appreciated that each individual display panel 22 may contain any predetermined number of LED lamps or other illumination elements, configured in any predetermined array such that information can be visually transmitted by the illumination by certain selected ones of the individual lamps within the lamp array associated with an individual display panel.

The keyboard 14 comprises a plurality of switch elements, as shown in FIGS. 1A and 1B as being of the keyboard type. Of course, any suitable switching element may be utilized. Furthermore, any of a number of switching elements may be used, each switching element corresponding 1-to-1 with an alphabetic, numeric, grammatic, or other informational character. Most conveniently, an electronic information display system 10 embodying these teachings and useful in the environment of small business activity, such as a luncheonette, restaurant, or the like, would require a keyboard 14 having keys assigned to each letter of the alphabet, each numeral from 0 through 9, various grammatical symbols as the period, hyphen, comma, exclamation point, quotation marks, as well as business symbols such as the dollar sign, percentage symbol, or ampersand. Further, a keyboard 14 embodying these teachings also provides a SPACE key whereby spaces may be disposed between individual informational characters. It is understood herein that the space is considered as relaying informational content to the viewer, and as such, is generated in the same manner as other informational characters which require illumination of selected ones of the LED's. (The "space" may be considered as relaying information by the illumination of none of the LED's. However, a panel 22 having a "space" therein is defined as transmitting information.) The keyboard 14 also includes a backspace, or ERASE key, and an ALL CLEAR key, the operation of each being fully discussed herein. Again, it is understood that due to the simplicity and redundancy of the operative circuit elements within the control circuit 16, the provision of any number of suitable display panels 22 and any predetermined number of alphabetic, numeric, or grammatic and business symbols may be utilized by a system 10 embodying the teachings of this invention. The individual panels are hereafter referred to by reference characters 22-1, 22-2, . . . 22-N, where N is the total number of panels 22 within the display board 12.

Due to the redundancy of circuit elements disposed within the control circuit 16, a complete understanding of the control circuit 16 may be had from the explanation of the illustrated portion thereof which follows herein. The control circuit 16 includes control circuit means associated with each display panel 22-1 . . . 22-N included within the visual display board. Each of the control circuit means is indicated on FIG. 3 by reference numeral "42" followed by the letter identifying the panel that is controlled thereby. Thus, control circuit means 42-1 controls the display panel 22-1, control circuit means 42-2 controls the panel 22-2, etc. Included within each of the control circuit means 42 is a logic arrangement indicated by reference numeral 44.

Control circuit means 42, including the logic arrangement 44, is associated with each panel 22 and with the keyboard 14 for sequentially illuminating selected ones of the LED's associated with each panel to display a single informational character within each panel in response to a signal generated by the actuation of a predetermined key in the keyboard 14. Further, delay means, indicated by reference numeral 46, are associated with the logic arrangement 44 for sequentially enabling the control circuit 42 of the next-successive panel 22 upon the display of information by a given panel. Note again, in this regard, that a panel is deemed to display information even if no LED associated therewith is illuminated, as in the case of the "space".

The circuit structure and operation whereby information is sequentially displayed on the display panels 22 is now discussed. However, before passing to a detailed description of the control circuit 16, reference is directed to FIG. 2 which illustrates a detailed schematic diagram of a power supply usable in connection with the control circuit 16.

Figure 2:
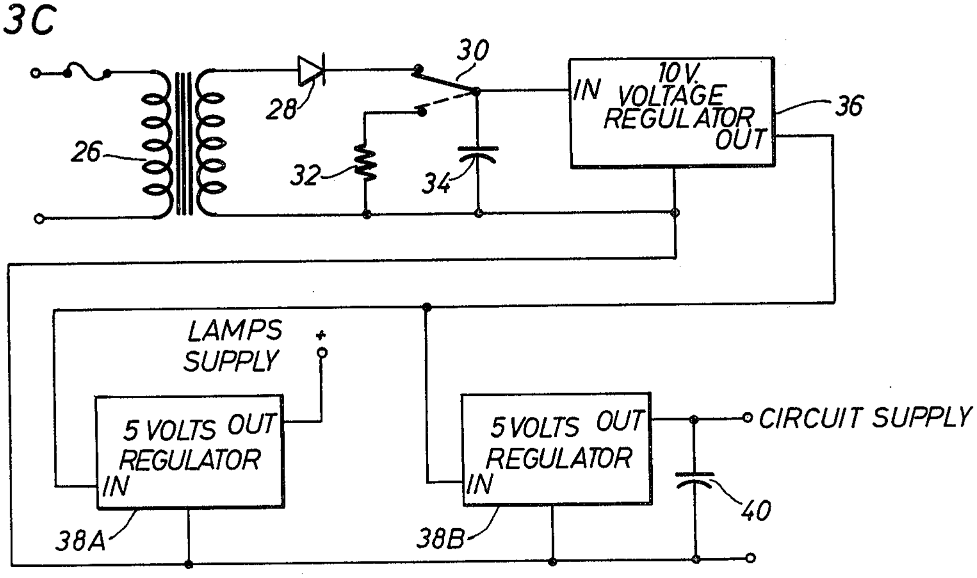
FIG. 2 is a detailed schematic diagram of a power supply network usable in connection with a control circuit embodying the teachings of this invention.

In FIG. 2, one side of a transformer 26 is connected through a fuse to a 115 V.A.C., 60 Hz line. The other side of the 10:1 transformer 26 is connected to the anode of a rectifying diode 28. The ON-OFF switch 30 (FIGS. 1A and 1B) of the control circuit 16 is, in the OFF position, tied to ground potential through suitable resistor 32. In the ON position the switch 30 is tied to the cathode of the diode 28, with a suitable shunt capacitor 34 being connected between the switch 30 and ground.

A voltage regulator 36 operable to output a regulated 10 V.D.C. output is connected to the switch 30, with the output of the regulator 36 being connected to parallel regulators 38A and 38B. The regulators 38A and 38B respectively provide a regulated 5 V.D.C. output to the LED array associated with each panel 22 and to the internal elements of the control circuit 16. A shunt capacitor 40 is tied between the output of the regulator 38B and ground.

Figure 3C:
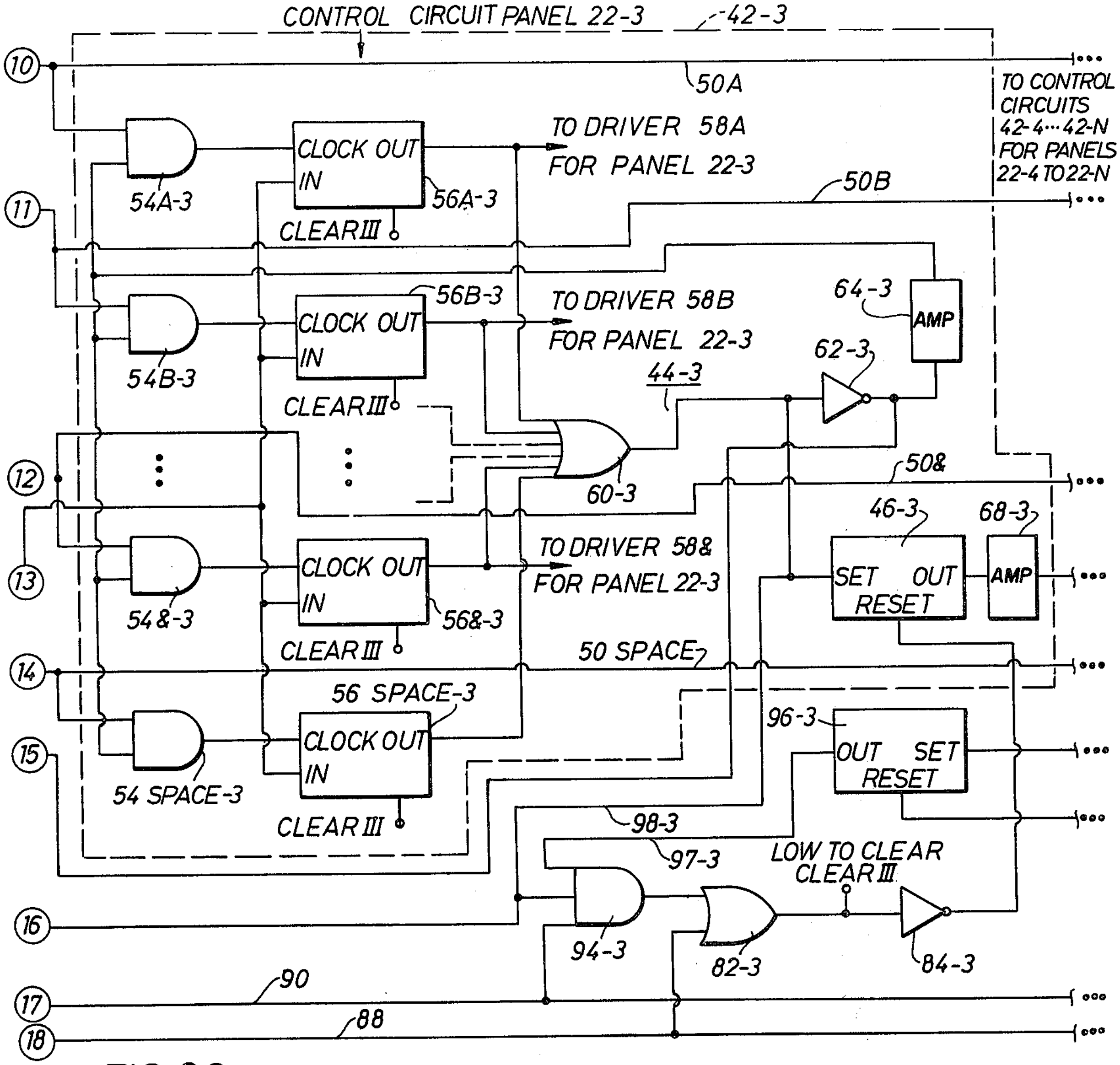
FIGS. 3A through 3C are detailed schematic diagrams of a portion of the control circuit used in an information display system embodying the teachings of this invention.
Figure 3A:
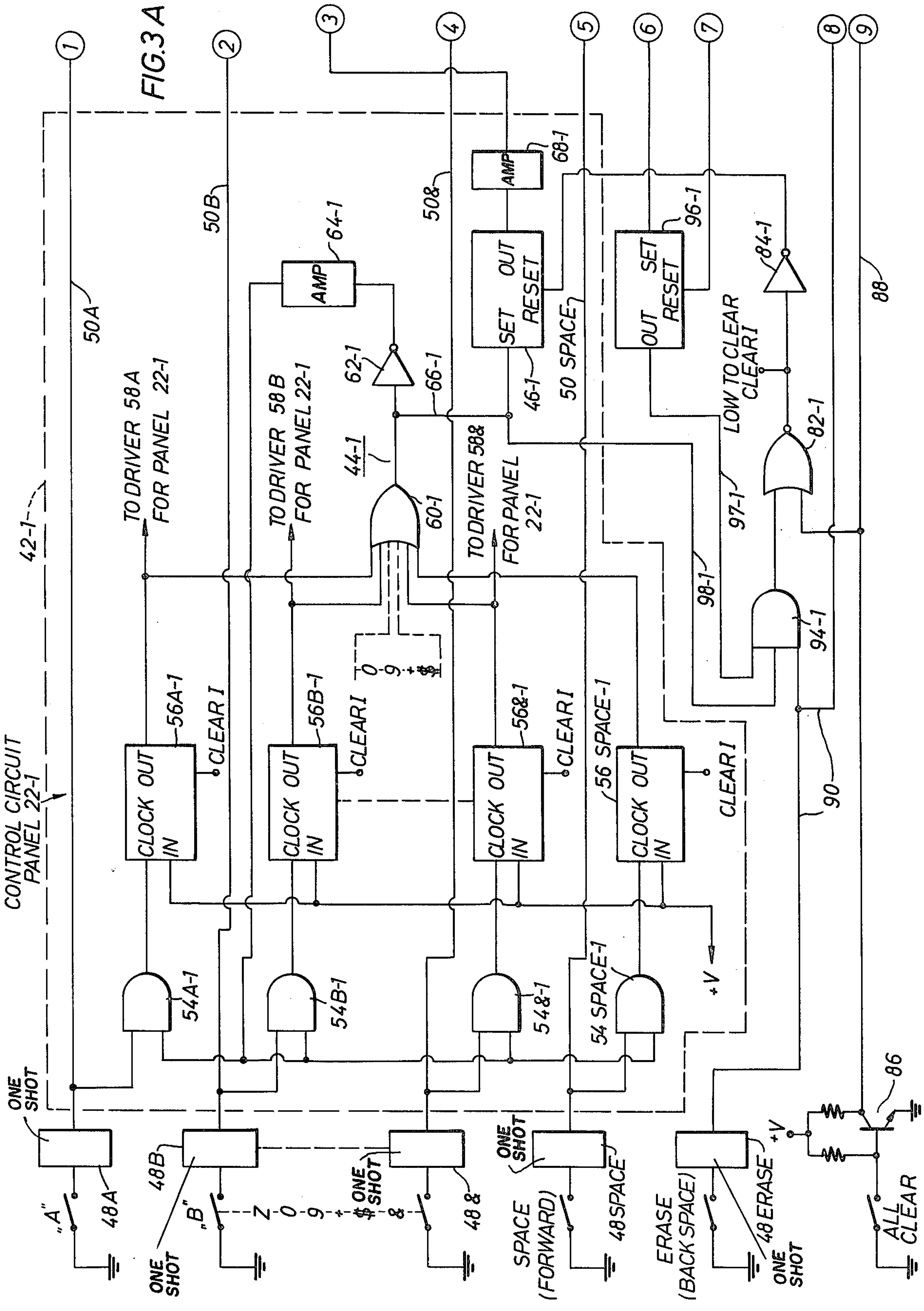
Figure 3B:
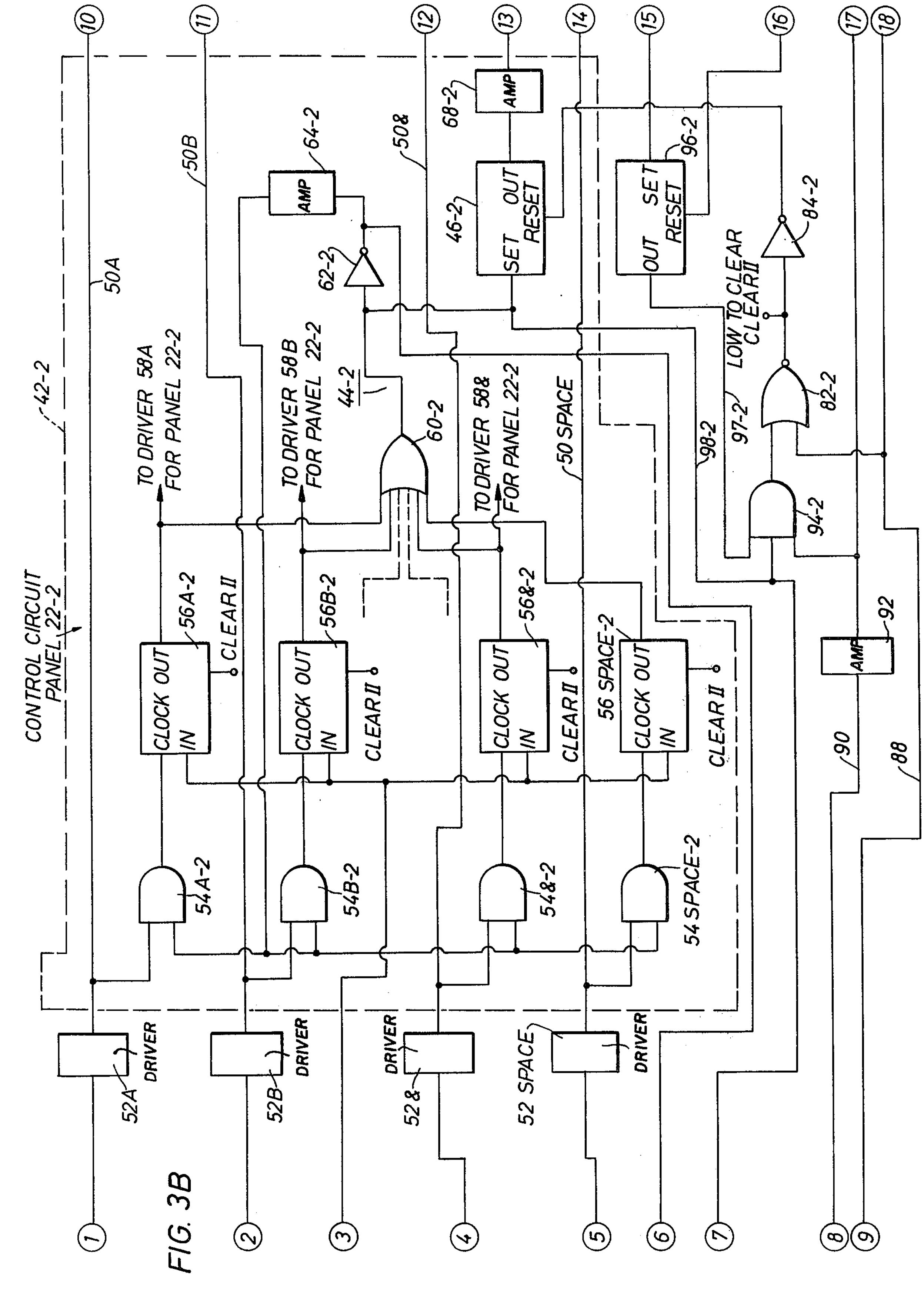

With reference to FIG. 3 it is appreciated that each of the alphabetic, numeric, business or grammatic symbols, as well as the SPACE, ERASE and ALL CLEAR keys are diagrammatically illustrated at the left-hand edge of the schematic diagram. The control circuit means 42-1, 42-2 and 42-3 are generally grouped by dot-dash lines and are respectively connected, as discussed above, with the first three display panels indicated on FIG. 1A as 22-1, 22-2, and 22-3. Since the control circuit 42 for each window panel 22 is substantially identical and redundant in nature, the same circuit configuration may be applied for any number N of display panels 22.

Each of the keys disposed within the keyboard 14 is connected to a one-shot circuit element such as manufactured and sold as model No. 74121 by Texas Instruments Incorporated, Dallas, Texas. Each of the one-shots 48, when connected to ground potential through the closure of its related key causes an electrical signal in the form of a pulse to appear at the output thereof. As is understood by those skilled in the art, the duration of the output pulse is independent of the time during which the associated key is held in the closed position. The duration of the pulse is held to a predetermined value as determined by the appropriate resistor and capacitor settings provided between the appropriate pins of the one-shot 48. For example, one particular circuit configuration utilizes a 27K ohms resistance and a 50 picofarad capacitance connected so as to provide an electrical output pulse of 1.35 microseconds duration at the output of the one-shot whenever a particular key associated with that one-shot 48 is depressed.

The one-shots 48 associated with each key are connected by common lines 50 to each control circuit arrangement 42 associated with each of the display panels 22. Buffers or drivers 52 are provided within each of the lines 50 to amplify the current carried thereby to each of the control circuits 42 for each of the window panels 22.

The output of each of the one-shot 48 is connected to the logic arrangement 44, in particular, to one input of an AND gate 54. The second input to the AND gates 54 are provided in a manner to be explained more fully herein. The logic arrangement 44 including the array of AND gates 54 provides means for permitting the entry of only one informational character into each window panel. The operational characteristics of the logic whereby only one informational character is permitted to be entered into each window panel is described in more detail herein.

The output of each of the AND gates 54 is connected to the clock input of a latch element 56. A D-flip-flop such as that manufactured and sold as model No. 7474 by Texas Instruments, Dallas, Texas is useful as the latch 56. The data input terminal of the array of latches 56 within the control circuit 42-1 is connected to a positive voltage source. The latches 56 operate such that, with a positive voltage at the data input, the receipt of a positive going edge pulse on the clock causes a signal of the same voltage magnitude as appears at the input pin to be presented at the output terminal Q thereof. The clear pins of the latches 56 are connected to a normally high potential and are operated in a manner discussed in more detail here. The Q outputs of each of the latches 56 is connected to an appropriate driver 58 associated with the LED lamps provided in the matrix array within each of the display panels 22. The detailed circuit diagram of a typical one of the drivers 58 is discussed in connection with FIG. 4.

The output of the latches 56 is also connected to one input of an OR gate 60, the output of which is connected to an inverter 62. In turn, the output of the inverter 62 is connected through a buffer amplifier 64 to the second inputs of each of the AND gates 54. The OR gate 60 and the inverter 62 are included with the AND gates 54 in the logic arrangement 44 to permit the entry of only one informational character into each window display panel 22. Any suitable logic arrangement other than that embodiment shown in FIG. 3 may, of course, be utilized to serve the intended function above described.

The delay means 46 (shown in complete detail in FIG. 5) is connected by a line 66 at its SET pin to the output of the OR gate 60. The output of the delay means 46 is connected through a buffer amplifier 68 to the input terminals of the latches 56 disposed within the control circuit 42-2 associated with the next-successive display panel 22-2. The delay means 46 provides for sequential enablement of each successive display panel 22 and permits that display panel 22 to display information only upon the condition that the previous display panel has been so utilized. Only when the delay time of the delay element 46 has passed are the inputs to the latches 56 associated in the control circuitry for the next-successive display panel provided with a high logic level. With the presence of a high logic level at the input to latches 56, the LED lamp array associated with that panel may be energized when the appropriate informational character is depressed.

The delay time of the delay means 46 is of a duration such that the next-successive control circuit 42 is enabled only at a time when the output pulse from the one-shot 48 is ended. (A 19 millisecond delay has been utilized and has been found an effective valve for the delay time. A 1.35 microsecond duration for the pulses from the one-shots has also been utilized and found an effective time duration for these pulses.) In this way, the sequential (and not simultaneous) entry of information into sequentially arranged display panels is permitted.

The operation of the system 10 whereby information is displayed in the display panels 22 is discussed.

Figure 4:
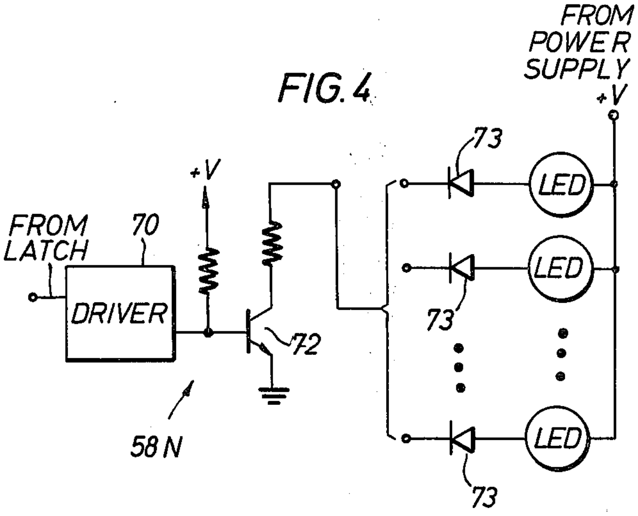
FIG. 4 is a detailed schematic diagram of a typical display panel driver operatively associated with the control circuit of FIG. 3; and, FIG. 5 is a detailed schematic diagram of a delay circuit used in the control circuit of FIG. 3.

For example, if it is desired to indicate the alphabetical character "B" in the first display panel 22-1, the operator depresses the "B" key disposed on the keyboard 14. Depression of the "B" key connects the input terminal of the one-shot 48B to ground potential to generate an output pulse of a predetermined duration (in this example, 1.35 microseconds) on the line 50B. The output of the one-shot 48B is connected to the first input of the AND gate 54B within the control circuit 42-1. The second input of the AND gates within the logic array disposed within the control circuit 42-1 for the first window panel 22-1 have been set to a normally high level. (This follows since the output of the OR gate 60-1 is normally low, thus maintaining the output of the inverter 64-1 in a normally high state.) The coincidence of two logic high signals at the inputs of the AND gate 54B-1 generates an output signal to the clock input of the 56B-1. Since the data input terminals of the latches 56 within the control circuit 42-1 are connected to a positive potential, the receipt of a positive going edge pulse at the clock presents a voltage equal to the positive potential at the output pin Q of the latch 56B-1. The output signal from the latch 56B-1 is applied to the driver circuit 58B-1 associated with the display panel 22-1 (FIG. 4). Energization of the driver 58 causes current to flow through the appropriate ones of the LED lamps disposed within the array within the display panel 22-1 so that information in the form of character "B" is illuminated within the display panel 22-1.

Referring to FIG. 4, the lamp driver circuit 58 includes amplifiers 70 connected to each of the latches 56 within each of the control circuits 42. Each amplifier 70 is, in turn, connected to a transistor switch 72. The collectors of each of the transistors 72 are connected to selected ones of the lamps within the array comprising the display panel. The individual LED's are connected through diodes 73 to the collector of the transistor 72. In operation, upon receipt of a signal from the appropriate latch 56, the switch 72 energizes the appropriate ones of the LED's to display the appropriate informational character. This is made more clear in connection with the discussion of the operation of the system.

Figure 5:
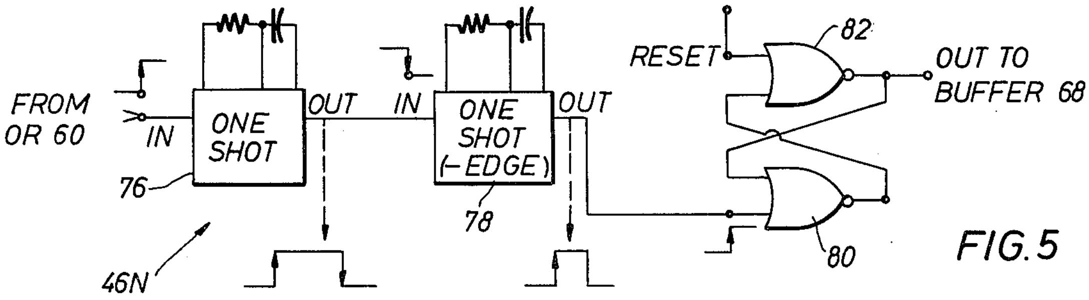

With reference to FIG. 5, the delay means 46 is shown to include cascaded one-shots 76 and 78, respectively triggered by the positive-going edge of a signal from the output of the OR gate 60 (FIG. 3), and from the negative-going edge of the signal from the first one-shot 76. Cross-coupled NOR gates 80 and 82 are respectively connected to the output of the one-shot 78. The delay means has an output and reset terminal. As discussed herein, the delay means shown in FIG. 5 is used as the delay means 46 and as the delay means 96.

The appropriate pin connections of input, output and reset for each such use are discussed herein.

Referring again to FIG. 3, the output from the latch 56B-1 is also applied to the OR gate 60-1 within the logic arrangement 44-1. The OR gate 60 has an input applied from the output of each latch 46. As known by those skilled in the art, a suitable OR configuration 60 is provided to accommodate inputs from M latches, where M is the number of informational characters used (including the "space" as such an informational character). The presence of a logic one at any input to the OR gate 60-1 changes the logical state at the output thereof from a normal logic zero to a logic one condition. Accordingly, the output of the inverter 62-1 is converted from its normal logic one condition, to a logic zero condition, effectively disenabling the entry of any further information into window panel 22-1 due to the presentation of logic zero signals at the second inputs to AND gates 54 connected within the logic array 44-1. Therefore, only one informational character may be introduced into the window display panel 22-1.

The delay means 46-1 is operative to prevent the simultaneous introduction of the character desired to be entered into the first panel, into the other N display panels in the following manner. When the "B" key relating to the character "B" is depressed and the output pulse from the one-shot 48B is carried over the line 50B, that signal (of 1.35 microsecond duration) is simultaneously presented to the first input of the AND gate 54B-2 associated with the control circuit 42-2. Although the second inputs to the AND gate 54B-2 is at a high level (due to the action of the inverter 62-2) it is noted that the application of an output signal from the AND gate 54B-2 to the clock of the latch 56B-2 presents no voltage signal at the Q output thereof because the data input pin of the latch 56B-2 is maintained at ground potential. However, once the first display panel 22-1 displays an informational character, the next-successive display panel 22-2 is enabled for the receipt of information by the energization of the data inputs of each of the latches 56 within the control circuit 42-2. This occurs by an output signal from the delay means 46-1. The SET input of the delay means 46-1 is derived from the output of the OR gate 60-1 on the line 66-1. When that output goes high, indicative of the display of an informational character in the first display panel 22-1, a positive potential is presented to the data inputs of each of the latches 56 within the control circuit 42-2 assocated with the second window display panel 22-2. However, the positive potential enabling these latches 56 is presented only after a time delay greater than the duration of the pulse emitted from the one-shot 48B. In this manner, only the desired window panel is presented with the predetermined informational character. Furthermore, only when the desired display panel has been presented with an informational character, the delay means operates to enable the next-successive window display panel for the display of information therein.

Having provided a "B" character in the first display panel 22-1, if it is desired to provide an "A" character, for example, in the display panel 22-2, it is simply necessary to depress the "A" key so as to connect the input of the one-shot 48A to ground potential. Again, an output of the one-shot of a predetermined duration (1.35 microseconds) is presented to the first input to each of the AND gates 54 associated within the N control circuits 42. However, only at the output of the AND gate 54A-2 is an output signal generated. This signal clocks the latch 56A-2 and applies the high logic level (applied through the buffer 68-1 to the data input terminals of the latches 56-2) to the output terminals thereof. Note that although the AND gate 54A-3 also applies a signal at its output to the clock input of the latch 56A-3, the latch 56A-3 has a zero potential at its data input due to the operation of the delay means 46-2.

The output of the latch 56A-2 is connected to a driver 58 associated with the LED lamps in the matrix array for the second display panel 22-2 and the appropriate ones of the LED lamps are energized so that the character "A" is illuminated on that panel. Simultaneously, an output from the latch 56A-2 is applied to the input of the OR gate 60-2 to convert the logic state at the output thereof from a zero to a one. The output of the inverter 62-2 simultaneously shifts from a logic one to a logic zero state to thus disenable the AND gates 54 within the logic 44-2.

A signal taken from the output of the OR gate 60-2 SETS the delay means 46-2 to enable the control circuit 42-3 associated with the third display panel 22-3 for receipt of the next informational character desired to be displayed. Again, the delay time of the delay means 46-2 exceeds the duration of the pulse emitted from the one-shot 48A, so that only the second display panel 22-2 displays the desired informational character.

The electronic information display system embodying the teachings of this invention further includes a back space, or ERASE, key and an ALL CLEAR key. With reference to FIG. 3, the circuit configuration and operation of each of these keys is discussed.

In general, both the ERASE and the ALL CLEAR keys clear information displayed on given display panels 22. The difference lies in the ERASE key being selectively able to clear, (that is, disenable) a given control circuit 42 from causing an informational character (including the "space") to be displayed in a given display panel, while the ALL CLEAR key acts to simultaneously clear (that is, disenable) the control circuits associated with all display panels. A "clear" (or "disenable") signal to a given latch 56 acts to clear any signal present at the output of that latch.

Each control circuit 42 has associated therewith a logic circuit comprising a NOR 82 and an inverter 84. The output of the NOR gates 82 are connected to the CLEAR pins of the latches 56 disposed within each control circuit 42. The NOR gate 82 output is normally high, so that the latches 56 normally have a logic high signal state applied to the CLEAR pins thereof and can therefore perform in the manner discussed above. However, if the logic high signal is switched a a logic low at the clear pins of the latches 56, any existing output at the latches 56 is cleared, effectively disenabling the particular control circuit 42. Thus, driving the output of the NOR gate 82 to a logic low state clears, or disenables, the particular latch 56 associated with a given control circuit.

Clearing of the latches 56 terminates the output signal from the Q output of the latch, as discussed above. As a result, the signal at the output of the OR gate 60 is also switched to a logic low condition. However, due to the nature of the delay means 46, changing the signal on the line 66 to a logic low will not disenable the logic high output from the delay 46. Accordingly, the output of the inverter 84 is connected to the RESET pin of the delay 46, so that in each instance where the latch 56 associated with a given control 42 is disenabled, the delay means 46 associated therewith is also reset.

The ALL CLEAR key operates to simultaneously disenable, or clear the latches 56 in each of the control circuits 42. The ALL CLEAR key, when depressed, connects the base of an NPN transistor switch 86 to ground, effectively switching the collector output of the transistor 86 from a normal logic low state to a logic high condition. The collector of the transistor 86 is tied to the second inputs of each of the NOR gates 82 by the line 88. The application of the logic high signal to the second input of the NOR gates 82 drives the output of the NOR gate 82 to a logic low condition, the state necessary for clearing the latches 56. In this manner, the latches 56 of the control circuits 42 are simultaneously disenabled, to thereby clear all the display panels and purge any previous information displayed.

To selectively clear a given control circuit 42, the ERASE, or back space, key is used. The depression of the ERASE key triggers a one-shot 48 ERASE, similar to the operation discussed in connection with the alphanumeric characters of the other keys. An output pulse of a predetermined duration (1.35 microseconds) is output on the line 90. A line buffer 92 is provided. However, in order to selectively clear the appropriate one of the latches 56, a logic network including AND gate 94 and a delay 96 (exactly similar to the delay means 46) are associated with each control circuit 42.

The SET and RESET pins of the delay 96 associated with a given control circuit 42 are respectively connected to the outputs of the inverter 62 and OR gate 60 in the logic 44 of the next-adjacent control circuit 42. The Q output of the delay 96 is applied as one input to the AND gate 94 by a line 97.

A second input to each AND gate 94 is derived from the output of the OR gate 60 within the logic 44 of the control circuit 42 with which the AND gate 94 is associated, as by a line 98. The third input to the gate 94 is derived from the ERASE key signal line 90. In operation, a given control circuit 42 is disenabled only upon the coincidence of three conditions. First, the ERASE key must be depressed. Second, the given control circuit 42 must be actuated (i.e., the panel is displaying information). Thirdly, the next-successive panel must not be displaying information.

The first condition is fulfilled by the depression of the ERASE key to generate an output from the one-shot 48 ERASE. The second condition is met if a logic high signal at the output of the given OR gate 60 is applied by the line 98 to the AND gate 94. The third condition is met if the next-successive panel is unoccupied. If it is, the output of the OR gate 60 of the next-successive control circuit is low, and the inverter 62 output is high. Thus, the Q output of a given delay 96 is logic high, thereby enabling the given AND gate 94 and applying a logic high signal to the input of the given NOR gate 82, clearing only the associated latch 56 and resetting the associated delay means 46.

The Q output of the delay 96 of the next-previous control circuit is normally in a logic low state. When the given panel is cleared, the output states of the OR gate 60 and the inverter 62 associated with the given control circuit change. However, the setting of the delay 96 of the next-previous control circuit (by the application of a logic one from the output of the given inverter 62) does not produce a change to logic one at the Q output of the next previous delay until a predetermined delay time (19 milliseconds) passes. The delay time (19 milliseconds) is greater than the duration of the pulse (1.35 milliseconds) on the line 90 from the one-shot 48 ERASE. Thus, only a given panel may be selectively cleared. Upon timing-out of the delay 96 in the next-previous control circuit, two of the appropriate inputs to the AND gate 94 thereof are present. Thus, if desired, depression of the ERASE key clears the next-previous panel. Alternatively, if desired, the given panel is cleared and ready for re-introduction of information. If an informational character is again introduced into the given display panel, the delay 96 of the next-previous control circuit is reset (by the application of a logic one from the output of the given OR gate 60) to thus immediately change the Q output of the next-previous delay 96 to its normal logic condition.

Having described a preferred embodiment of the invention, those skilled in the art may effect modification thereto, yet remain within the scope of the invention as defined in the appended claims.

What is claimed is:

1. An information display system comprising:

a display board having plurality of display panels, each display panel having an array of lamps associated therewith which, when energized, visually transmit information to a viewer;

a keyboard having a plurality of keys, each key corresponding to an informational character, the actuation of any key generating an actuating signal of a first time duration;

a control circuit associated with each display panel for energizing that panel in response to an actuating signal, each control circuit being connected to each key such that an actuating signal generated by actuation of any key is applied simultaneously to each control circuit;

a logic arrangement connected within each control arrangement, each logic circuit being responsive to the energization state of the display panel with which it is associated and to the energization states of the panels next-successive and next-previous thereto;

each logic arrangement being operative to enable the control circuit to energize its associated panel only upon the conditions that the next-previous panel is energized and the associated panel and the next-successive panel are not energized; and a delay circuit connected to each control circuit and to the control circuit of the next-successive panel, each delay circuit being responsive to the energization of the panel with which it is associated to apply to the next-successive panel, after a time delay greater than the first time duration, a signal respresentative of the energized state of the associated panel.

2. The information display system of claim 1 further comprising:

a key adapted to generate an erase signal of the first time duration;

a second logic arrangement connected to each control circuit and to the control circuit of the next-successive panel to de-energize a display panel in response to an erase signal only on the conditions that the associated panel is energized and that the next-successive panel is not energized.

3. The information display system of claim 2 further comprising:

a second delay circuit conected to each second logic arrangement and to the control circuit of the next-successive panel, each second delay circuit being responsive to the de-energization of the next-successive panel to apply, after a time delay greater than the first time duration, to the second logic arrangement of its associated panel a signal representative of the de-energization of the next-successive panel.

* * * * *